United States Patent [19]

Schiepe

[11] 4,417,836

[45] Nov. 29, 1983

[54] DEVICE FOR SEPARATING A STACK BY LAYERS, PARTICULARLY A STACK OF LONG TIMBERS OR LUMBER

[75] Inventor: Heinz Schiepe, Berlin, Fed. Rep. of Germany

[73] Assignee: Heinz Schiepe Grosshandel und Generalvertretung für Holzbearbeitungsmaschinen, Fed. Rep. of Germany

[21] Appl. No.: 256,010

[22] Filed: Apr. 21, 1981

[30] Foreign Application Priority Data

Apr. 21, 1980 [DE] Fed. Rep. of Germany ....... 3015648

[51] Int. Cl.³ .................... B65G 59/02; B65G 60/00
[52] U.S. Cl. .................................. 414/32; 271/128; 414/117; 414/118
[58] Field of Search .................. 414/32, 42, 112, 113, 414/114, 117, 118, 119, 120, 121, 123, 124; 271/42, 128, 130, 135, 190, 225; 221/238, 278

[56] References Cited

U.S. PATENT DOCUMENTS

| | | | |
|---|---|---|---|
| 256,511 | 4/1882 | Stillwell. | |
| 2,672,244 | 3/1954 | Van Schie | 271/42 |
| 3,067,885 | 12/1962 | Kohler | 414/123 |
| 3,565,266 | 2/1971 | Buss | 414/118 |
| 3,768,807 | 10/1973 | Spengler | 271/190 |
| 3,870,167 | 3/1975 | Werner | 414/119 X |
| 3,991,893 | 11/1976 | Lynch | 414/117 |
| 4,247,093 | 1/1981 | Kistner | 271/225 X |

FOREIGN PATENT DOCUMENTS

| | | | |
|---|---|---|---|
| 2045614 | 11/1971 | Fed. Rep. of Germany | 414/42 |
| 2433128 | 1/1976 | Fed. Rep. of Germany | 414/114 |
| 734106 | 5/1980 | U.S.S.R. | 414/117 |

Primary Examiner—Leslie J. Paperner
Attorney, Agent, or Firm—McGlew and Tuttle

[57] ABSTRACT

A device is disclosed for separating at least one elongated member or layer of members, particularly a layer of elongated lumber pieces, which comprises a shifting unit for shifting a top layer above the lumber pieces partly off the remainder of the stack. The shifting unit is positioned at one end of the stack and moves part of the shifted layer out over the opposited end of the stack. A propping unit is positioned at the opposite end of the stack and is movable up and under the overhanging part of the shifted layer and then across the top of the remainder of the stack to separate this layer from the remainder of the stack. Transfer arms are provided which can be moved into the space between the shifted and separated layer and the remainder of the stack to support the layer and transfer it away from the stack for further processing.

26 Claims, 22 Drawing Figures

DEVICE FOR SEPARATING A STACK BY LAYERS, PARTICULARLY A STACK OF LONG TIMBERS OR LUMBER

FIELD AND BACKGROUND OF THE INVENTION

The present invention relates in general to devices and techniques for manipulating the individual pieces of a stack of pieces, and in particular to a new and useful device for separating or unpiling a stack, by layers, particularly a stack of lumber or timber pieces.

In a prior art device of this kind, a stacked layer in its full length, is shifted off the remainder of the stack. The layer is then deposited on a receiving structure provided behind the stack, where the stack layer is taken apart. Such a device requires at least double the length of the stack, and thus a considerable amount of space. In addition, an operation of shifting a complete stack layer out of the stack is very time consuming.

A device for automatically supplying working machines with long pieces that are withdrawn from an orderly arranged stack, is known from German AS No. 2,323,227. With this device a stack layer is pushed transversely off a stack, by means of engaging members and then taken apart by shifting the individual pieces in their longitudinal direction. A transverse pushing, however, is possible only if the sliding surfaces of the layers in the stack, are absolutely smooth. Such a device also requires that all the individual pieces of a stack layer have exactly equal thicknesses and are absolutely even, that is, not warped, bent, or the like. Otherwise the device requires the use of a plurality of regularly spacer elements or so called stickers, provided transversely between every two stack layers. Since such ideal conditions rarely occur, in practice, a transverse shifting of a stack layer is possible only when a stack with stickers is used.

SUMMARY OF THE INVENTION

The present invention is directed to a device of the above mentioned kind with which unpiling of a stack, in layers, is possible in a space saving manner and in a fast sequence of operations, to either supply working machines at a fast rate, with individual pieces or, for example, to form a pile under air spaces between in divided layers from a solid unspaced stack of layers.

In accordance with the invention, each stack layer is pushed out off the remainder of the stack by only a small amount in the longitudinal direction of the pieces in the stack. This is accomplished by using a shifting assembly. At the side of the stack opposite the shifting assembly, the end portion of the top stack layer is thus moved over a propping assembly whose top is located close beneath the lower face of the pushed out stack layer. By lifting the propping assembly, the top stack layer is lifted from the rest of the stack so that sequentially operating transfer arms can be extended across the rest of the stack and into the gap thus formed between the stack layer and the rest of the stack. The arms can thus receive the stack layer. The inventive device requires only slightly more space than the stack itself. The individual stack layers are pushed out over a short distance and in very little time.

According to a development of the invention, the shifting assembly comprises individual juxtaposed shifting members which are movable independently of each other and automatically apply against the ends of the individual pieces of the stack layer which might be of unequal shape. Advantageously, the shifting assembly is movable up and down in the vertical direction.

Another development of the invention provides an element for holding the stack layer down, which element is located above the propping assembly. This makes it possible to pivot the lifted stack layer about the propping assembly, with the shifting assembly being moved, at the same time, upwardly. The stack layer is thereby completely lifted from the stack and all the transfer arms can be extended to receive the stack layer. Such an operation however, may be provided only with relatively short stack layers.

In a further development of the invention, the propping assembly is mounted for substantially horizontal displacement toward and away from the shifting assembly. Upon lifting the pushed out stack layer, the propping assembly can be displaced in the space between the layer and the stack in the direction of the shifting assembly, so that the stack layer is gradually elevated and finally lifted completely, and sequentially all the transfer arms can be extended below the layer after the propping assembly has passed their zone of extension.

Accordingly, an object of the present invention is to provide a device for separating one elongated member at a time from a stack of such members comprising, shifting means positionable at one end of the stack for shifting a member of the stack so as to move a part of the member out over an opposite end of the stack, a propping element initially positionable at the opposite end of the stack movable up under the part of the member over the opposite end of the stack and across the top of the remainder of the stack, and driving means connected to the propping member for moving the propping member up under the part of the one member shifted by the shifting means and across the top of the remainder of the stack.

Another object of the invention is to provide such a device which can separate a layer of such members from a stack of layers of such members, the shifting means shifting an entire layer of the stack to overhang an opposite end of the stack and the propping element moving up under the entire layer of members, the device including movable transfer arms which are movable between the layer of members, as they are lifted by the propping element, and the top of the stack, to receive the layer.

Another object of the invention is to provide such a device wherein the shifting assembly comprises a plurality of lamellar shifting levers extending across a width of the stack for individually engaging one or more members disposed in a single layer of the stack, to move the entire layer partly off the stack.

A still further object of the invention is to provide such a device including a hold-down assembly for holding an end of the member or layer of members separated from the stack, adjacent the opposite end of the stack, as the propping element moves across the top of the stack from the opposite end to the first mentioned end of the stack.

A still further object of the invention is to provide such a device for separating or unpiling layers of members from a stack of such members which requires only little more than the length of the stack for operation.

Another object of the invention is to provide such a device for separating or unpiling members or layers of members from a stack, particularly elongated lumber members or pieces, which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the following, some embodiments of the invention are explained in more detail with reference to the drawings in which.

DESCRIPTION OF THE PREFERRED EMBODIMENTS

Turning to the drawings in particular, the invention embodied therein, comprises a device for separating or unpiling at least one elongated member at a time from a stack of such members, particularly layers of members made up of a plurality of elongated lumber or timber pieces, which comprises shifting means 2 positionable at one end of a stack 1 for shifting a member or layer of members 3, partly off the stack so that a part of the shifted member or layer of the members is moved out over an opposite end of the stack, a propping element 4 initially positioned at the opposite end of the stack which is movable up under the shifted member or layer of members and across the top of the remainder of the stack to separate the member or layers of members from the stack, and transfer means in the form of arms 6 movable into the space between the shifted and separated layer and the remainder of the stack.

Figure 1:
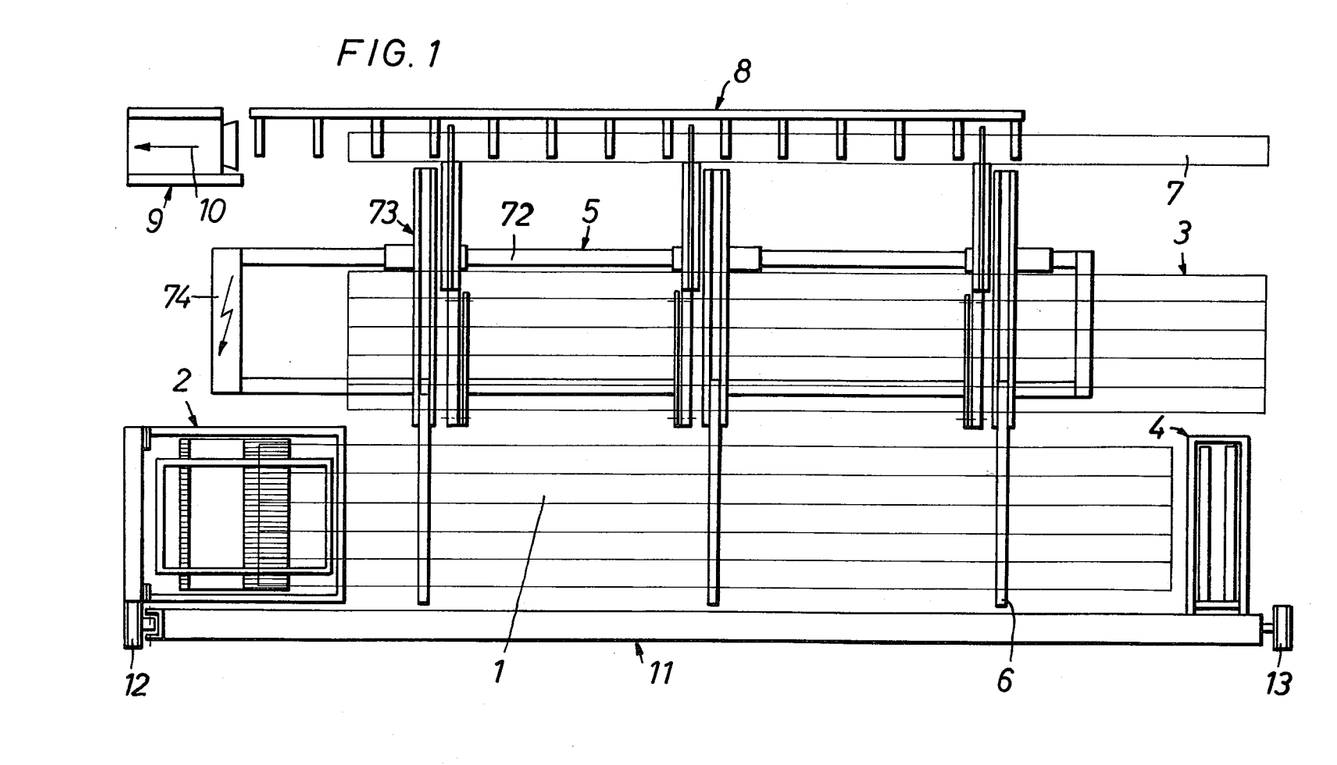
FIG. 1 is a top plan view of the device according to the invention.

The top plan view of FIG. 1 shows a device according to the invention, for unpiling a stack 1 of long and shaped timbers or lumber stock. The device comprises a shifting assembly 2, installed at one end of the stack, which functions to push individual layers of lumber 3, of the stack 1. A propping assembly 4 is also provided and installed at an opposite end of the stack. Propping assembly 4 is used to engage one end of the stack layer 3 which has been pushed out by shifting assembly 2. An automatic transfer assembly 5 is installed along side the stack and equipped with horizontally extensible and retractable transfer arms 6 which extend above the stack to engage the stack layer 3 and to separate the individual pieces of lumber 7 which are to be fed in the direction of arrow 10, to a working machine (not shown). The device further comprises a guide track 11 for horizontally moving propping assembly 4 and columns 12 and 13 for supporting guide track 11 and shifting assembly 2.

Figure 2:
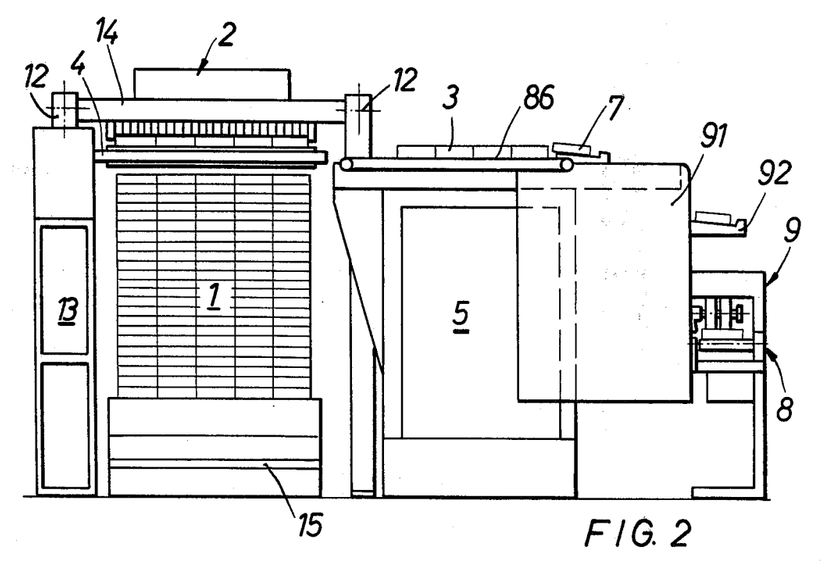
FIG. 2 is a side elevational view of the device of FIG. 1.

As seen in FIG. 2 which is a side elevational view of the embodiment of FIG. 1, columns 12 form a gantry structure with a crossbeam 14 which carry shifting assembly 2. Stack 1 is placed on a lifting table 15 which, upon the removal of one stack layer 3, can be vertically elevated by one layer thickness.

Figure 3:
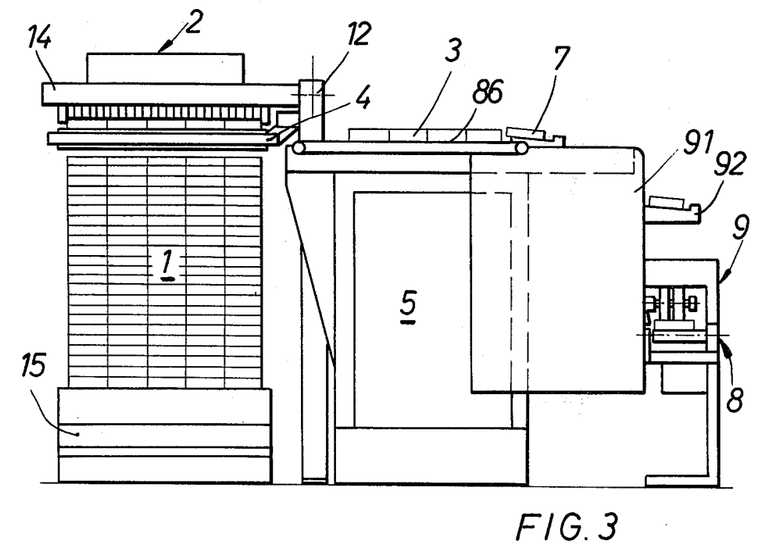
FIG. 3 is a view similar to FIG. 2 of a different embodiment of the device.

The embodiment of FIG. 3 differs from that of FIG. 2 only in that a single column 12 with a crossbeam 14 is provided for supporting shifting assembly 2. In this embodiment, column 12 is provided between stack 1 and the automatic unit 5 for the unpiling or separating operation. Column 13 and the guide track 11 which extends between columns 12 and 13 are also provided between stack 1 and automatic unit 5, in the embodiment of FIG. 3 and both columns are in position outside the opposite ends of stack 1. (Column 13 and track 11 are not shown in FIG. 3, however.)

Figure 4:
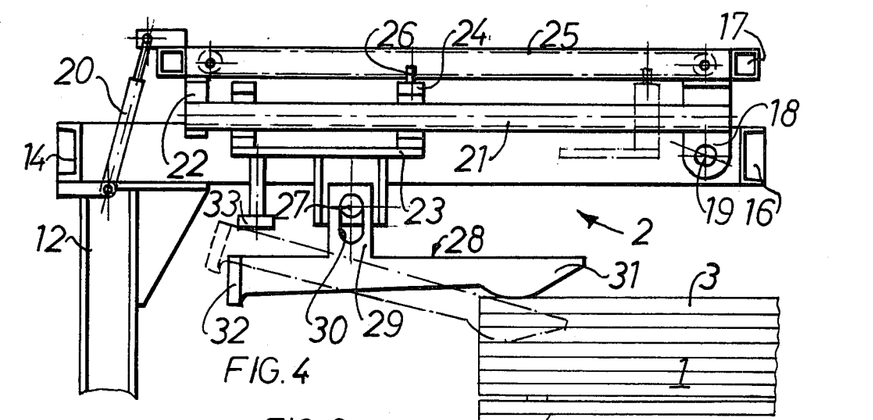
FIG. 4 is a longitudinal sectional view of the shifting assembly of the inventive device.
Figure 5:
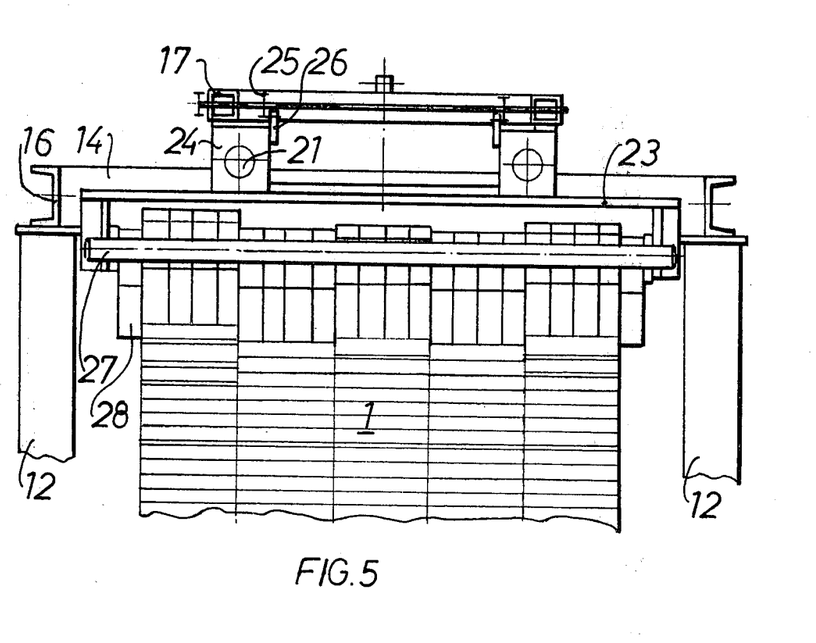
FIG. 5 is a transverse sectional view of the shifting assembly of FIG. 4.
Figure 6:
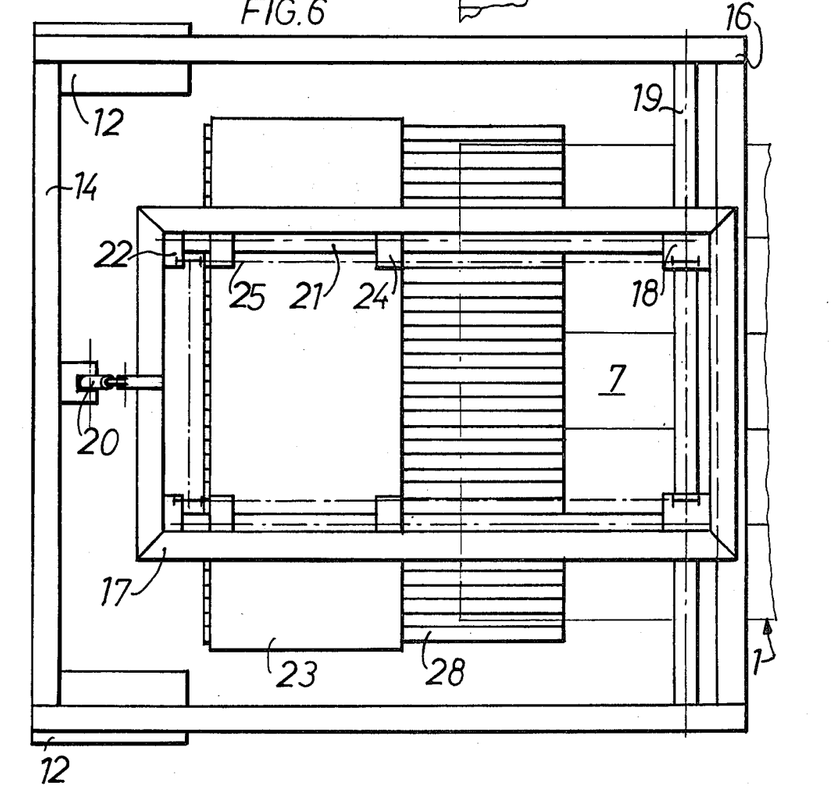
FIG. 6 is a top plan view of the shifting assembly of FIG. 4.

Shifting assembly 2, shown in detail in FIGS. 4, 5 and 6, is mounted within a horizontal, U-shaped frame 16 which is secured to cross beam 14. Shifting assembly 2 comprises a rectangular frame 17 which is hinged by means of two downwardly projecting extensions 18, to a tubular cross tie 19 provided at the front end of frame 16. Rectangular frame 17 is braced at its rear end against cross beam 14 by a piston and cylinder unit 20. Guide rods 21 extending below the two longitudinal sides of rectangular frame 17 are secured by their front ends to extensions 18 and by their rear ends to corresponding extensions 22. Below guide rods 21, a shifting plate 23 is provided which extends transversely over stack 1 and is guided by two guide sleeves 24 on guide rods 21. Chain drives 25 are provided at both longitudinal sides of rectangular frame 17 for moving shifting plate 23 back and forth along guide rods 21. The chains are driven in a conventional manner (not shown) on the sprockets 25a. Chain drives 25 are connected to shifting plate 23 by links 26 which are secured to front guide sleeves 24 of the plate 23.

A guide rod 27 extends beneath shifting plate 23 and above and across stack 1. It is supported on the two short sides of shifting plate 23. Guide rod 27 carries a bank of lamellar shifting members 28 which extend, side by side, in the shifting direction (to the right in FIG. 4)

and are provided with about centrally located extensions 29 having substantially vertically extending oblong slots 30 through which guide rod 27 is passed. The individual shifting members 28 have a rounded, heavy front end portion 31 and a lighter, hook-like rear portion 32. With their rounded front end portion 31, the shifting members rest on the individual layers 3 of stack 1. With their hook-like rear ends 32, shifting members 28 engage the individual pieces or members 7 of the stack layer 3, to be pushed from behind. Due to this design, unequally long, warped, or otherwise nonuniform stacked pieces or members 7 can securely be engaged and shifted, as shown in FIG. 5. Oblong slots 30 allow shifting of members 28 to slightly different levels needed for the shifting operation where members 7 in a layer 3 are not uniform.

Above the rear ends 32 of shifting members 28, a crosswise extending stop 33 is secured to the underside of shifting plate 23.

Figures 7, 9:
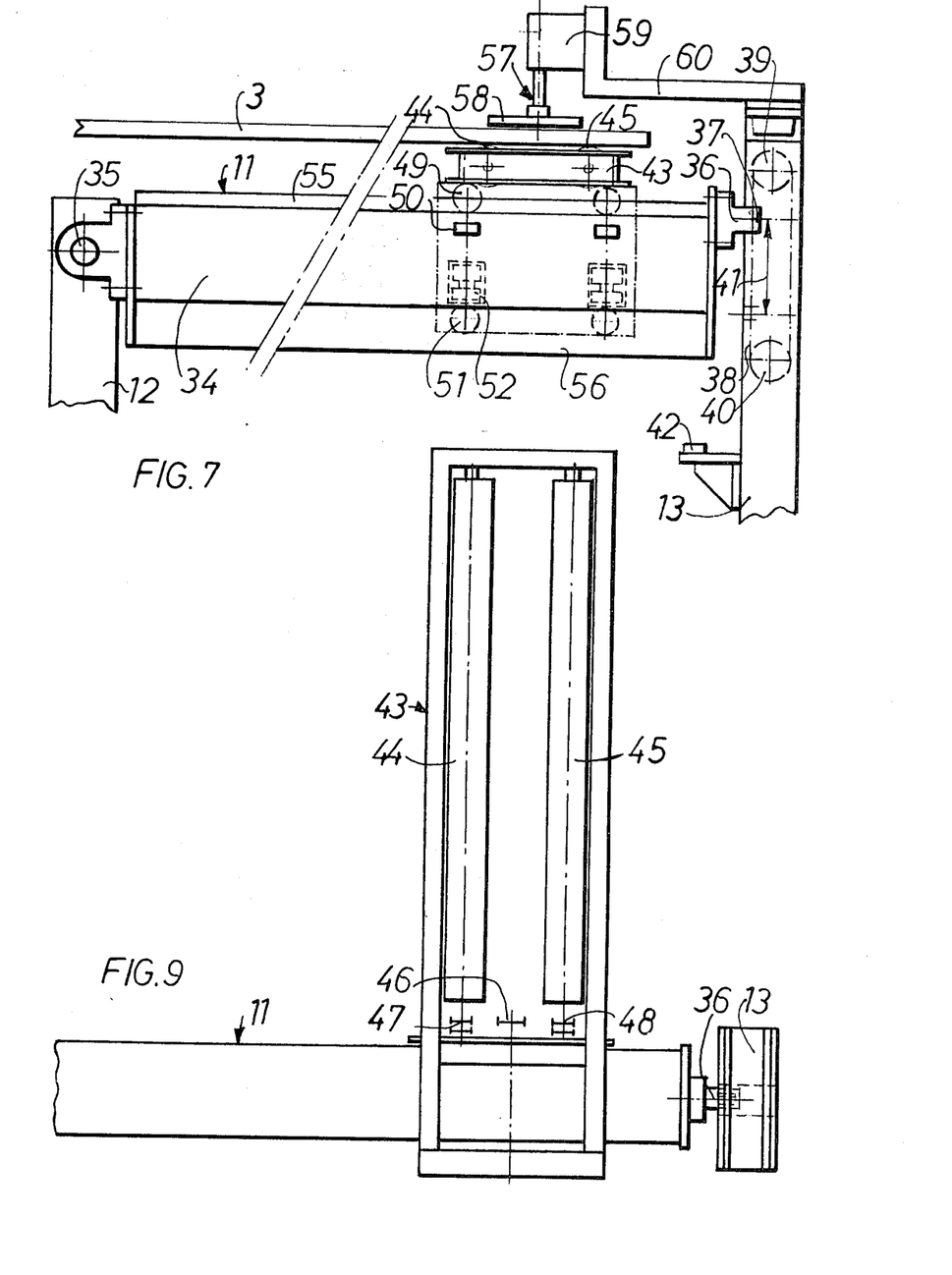
FIG. 7 is a side elevation of the propping assembly of the inventive device.
FIG. 9 is a top plan view of the propping assembly of FIG. 7.
Figure 8:
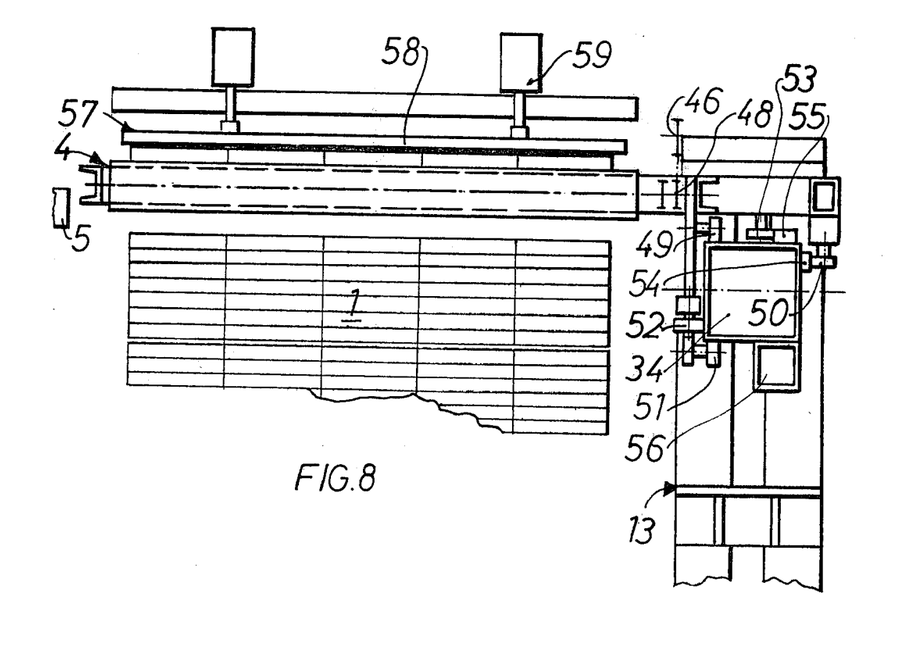
FIG. 8 is a front view of the propping assembly of FIG. 7.

Piston and cylinder unit 20 makes it possible to pivot shifting assembly 2 about cross tie 19, in order to move it upwardly during the operation of lifting a stack layer 3. FIGS. 7, 8 and 9 show details of the propping assembly 4 and guide track 11. Guide track 11 substantially comprises a box girder or beam 34 with a square cross-section, which is supported by one of its ends through a hinge 35 on column 12 and connected on its other end, by means of an extension 36, to a chain link 37 of a chain drive 38 which is passed around two sprocket wheels 39 and 40 mounted in column 13. Extension 36 and that end of beam 34 are thus movable up and down (arrow 41). This motion is effected by a piston and cylinder unit (not shown), acting on chain drive 38. A bracket 42 is provided on column 13 to support guide track 11 in its rest or lowest position.

Propping assembly 4 is movable along guide track 11 on box girder 34. The assembly comprises a rectangular frame 43 mounted on box girder 34, and two rollers 44 and 45 which are supported by the short sides of frame 43 and extend along the long side thereof across stack 1. The surfaces of rollers 44,45 project upwardly beyond the upper level of rectangular frame 43. Both propping assembly 4 along guide track 11, and rollers 44, 45 are drivable by means of chain drives (not shown) including sprocket wheel 46, 47 and 48. Rectangular frame 43 is mounted on box girder 34 by pairs of rollers 49 to 53 of which rollers 49 apply against the top, rollers 51 against the underside, and rollers 52 against the inside wall of box girder 34. Rollers 50 apply against the outside wall of box girder 34 through a guide strip 54 secured to the girder. Rollers 53 run on another guide strip 55 which is secured to the top wall of girder 34. A further box girder 56 having a substantially smaller cross-section extends along the underside of box girder 34.

As shown in FIGS. 7 and 8, a hold-down 57 extends across stack 1 and above propping assembly 4 at the location where the propping assembly is in its initial position at one end of the stack. Hold-down 57 substantially comprises a plate 58 extending crosswise of the stack, and two thrust members 59 which are spaced apart along plate 58 and are secured to a cantilever support 60 which is rigidly mounted to the upper end of column 13.

Figure 10:
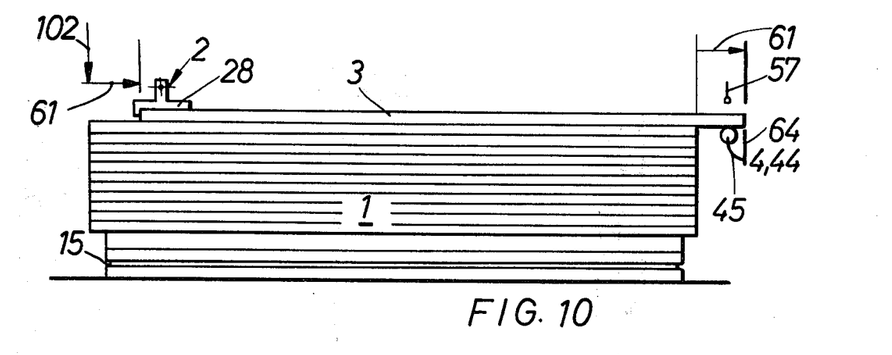
FIGS. 10 to 14 respectively, sequentially, show the operation of the inventive device.
Figure 11:
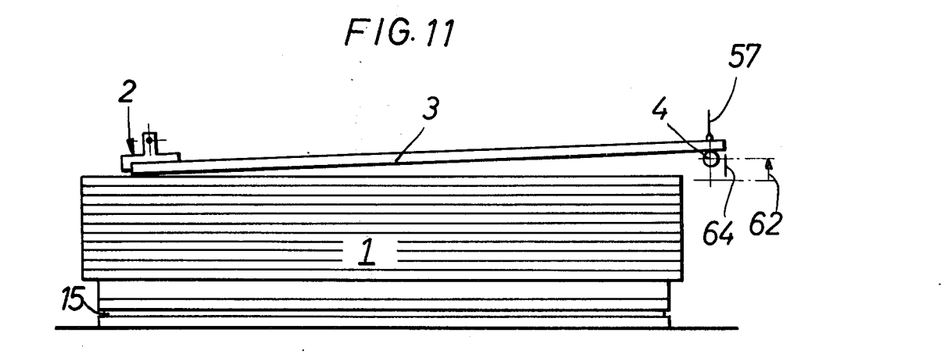
Figure 12:
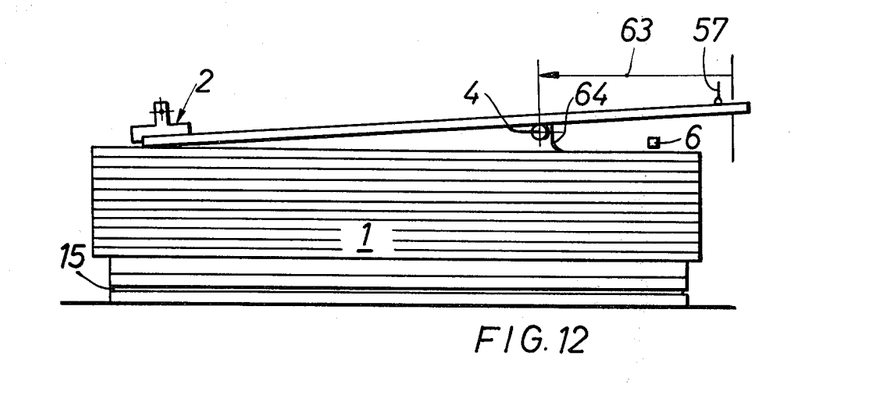

With reference to FIGS. 10 through 14, the described assemblies operate as follows:

From stack 1, resting on shifting table 15, the uppermost layer 3 is shifted out by a small distance, as indicated by arrow 61, by means of shifting members 28 of shifting assembly 2 which is in its lowered position (arrow 102). At the opposite side of stack 1, the stack layer 3 is thus displaced to project partly out over the end of the stack, by the corresponding amount (arrow 61), so that the ends of the pieces extend above rollers 44 and 45 of propping assembly 4 (FIG. 10). Then, propping assembly 4 is lifted to a certain level (arrow 62) to allow the stack layer ends to apply against hold-down 57 (FIG. 11). Thereupon propping assembly 4 is moved over stack 1, in the direction of shifting assembly 2 (arrow 63 in FIG. 12) which remains in its shifting position, so that a first transfer arm 6 can be extended across the stack top and into the space formed between the lower layers remaining in place on the stack, and the underside of the lifted stack layer 3.

Figure 13:
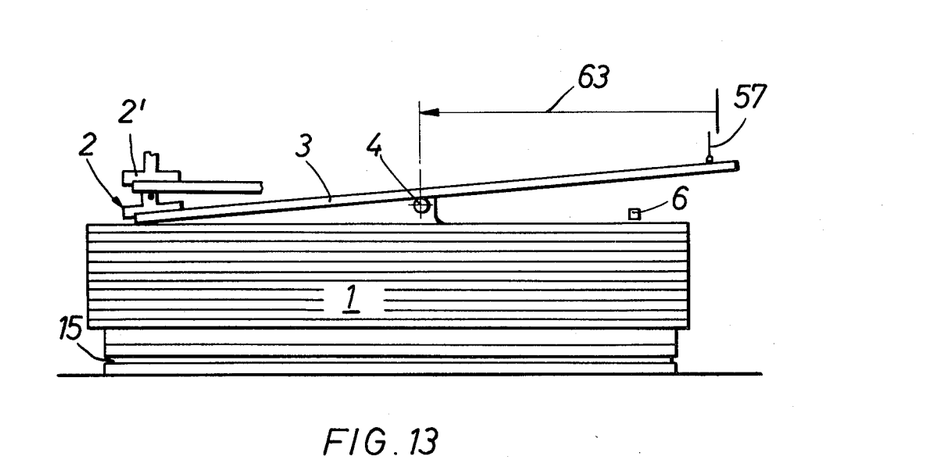

During further motion of propping assembly 4 in the direction of shifting assembly 2 (arrow 63 in FIG. 13), while layer 3 continues to be lifted, shifting assembly 2 also is lifted by a small amount (position 2' in FIG. 13). As propping assembly 4 moves in the direction of arrow 63, additional transfer arms 6 are extended into the space below the lift layer 3. As soon as propping assembly 4 reaches its extreme end position (FIG. 14), stack layer 3 is placed on transfer arms 6 which are then retracted (not shown) to transfer the stack layer 3 to the hereinafter described automatic transfer unit 5.

Figure 14:
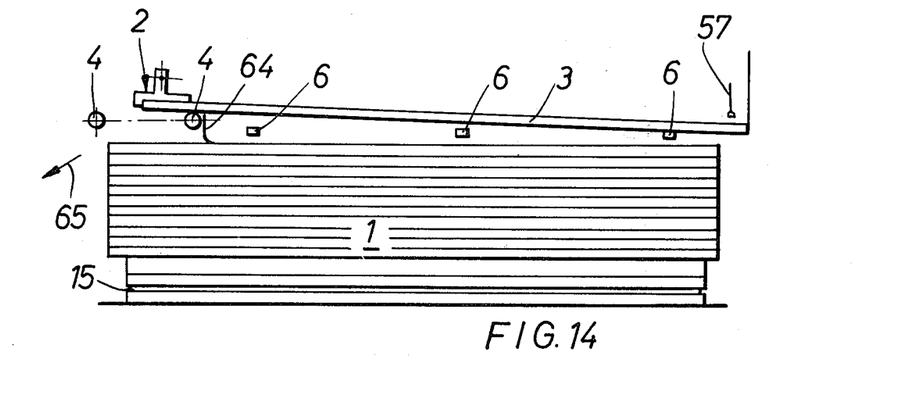

As indicated in FIGS. 10 to 14, propping assembly 4 also comprises an associated brush element 64 by which, during the horizontal motion of propping assembly 4 above the stack, spacer strips or stickers 100, which may be inserted between layers (not shown) are swept and ejected in the direction of arrow 65 (FIG. 14).

Figure 18:
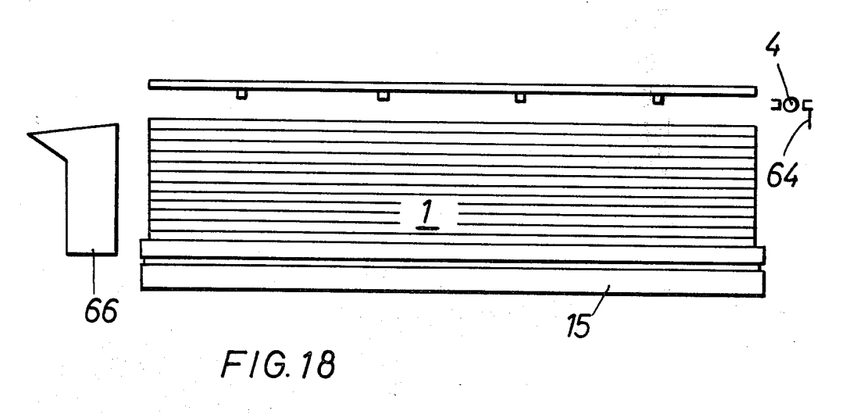
FIG. 18 corresponds to FIG. 15 and shows a design in which the sweeping brush is secured to the frame of the propping assembly which is horizontally movable.
Figure 19:
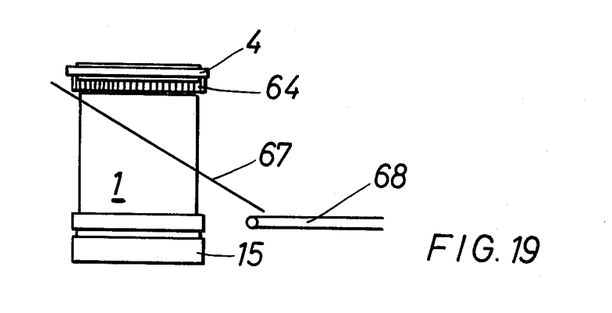
FIG. 19 is a side elevation corresponding to FIG. 18.

The ejected stickers may be collected in a receptacle 66 (FIG. 18), or directed over a chute 67 to a discharge conveyor 68 (FIG. 19).

Figure 15:
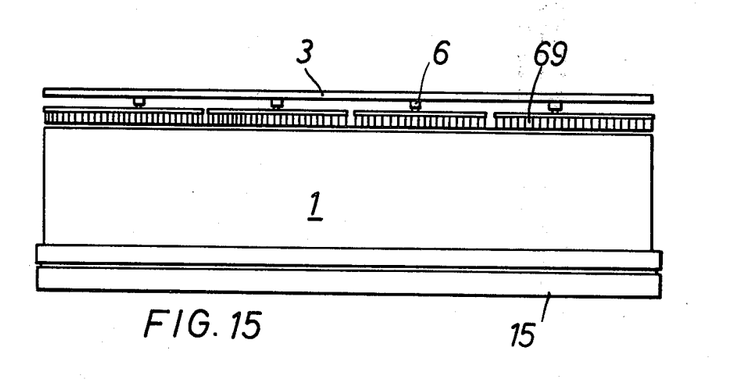
FIG. 15 is a longitudinal side view of a stack of lumber, with a stack layer being received on extended transfer arms and with brushes for sweeping stickers on the lumber, provided beneath the transfer arms.
Figure 16:
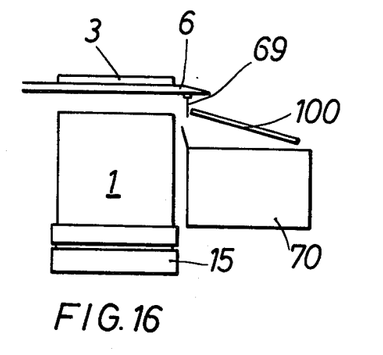
FIGS. 16 and 17 are side elevations corresponding to FIG. 15 which show various possibilities for discharging the swept stickers.
Figure 17:
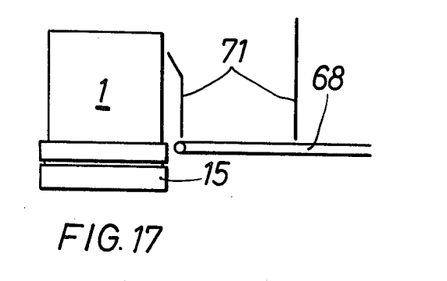

In another embodiment shown in FIGS. 15 to 17, brushes 69 for sweeping sticks or stickers 100 may be provided in transverse position, below every transfer arm 6, so that the stickers are swept into a receptacle 70 at the side of the stack as the arms 6 are extended (FIG. 16). Instead of receptacle 17, guide sheets 71 may be employed for directing the stickers to a conveyor 68 (FIG. 17).

Figure 20:
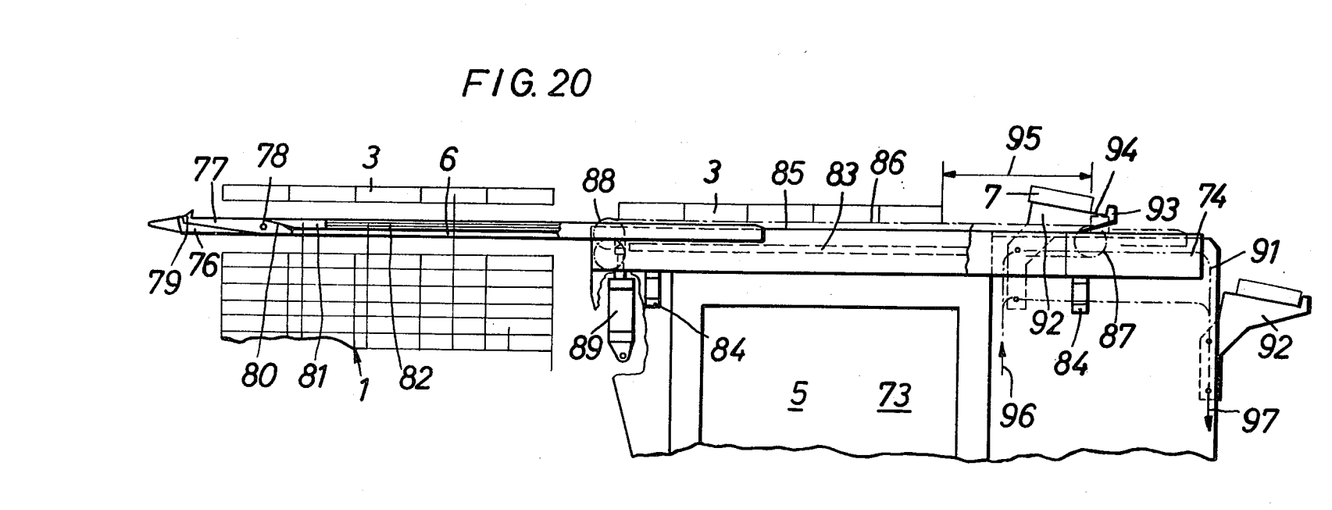
FIG. 20 is a partial view of an automatic unpiling unit of the invention installed adjacent the lumber stack and having its transfer arms extended.
Figure 21:
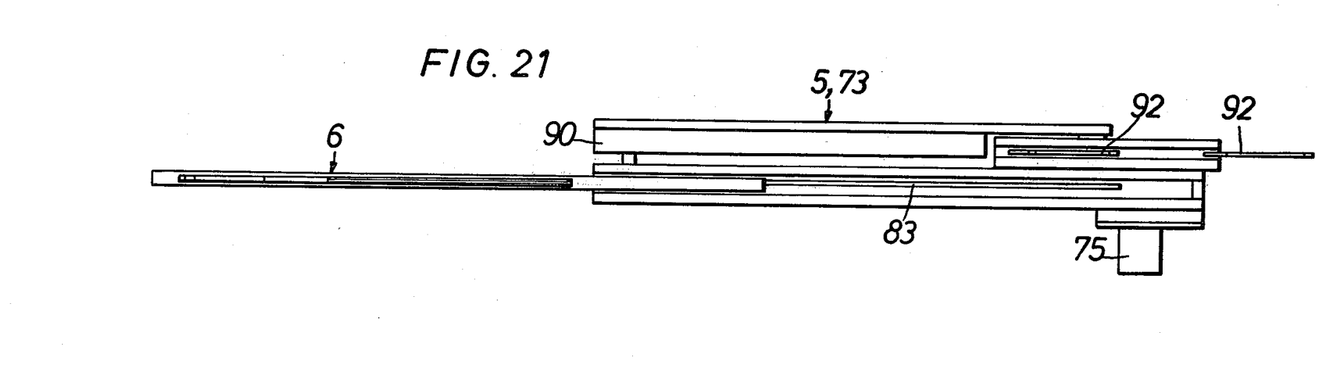
FIG. 21 is a top plan view corresponding to FIG. 20.

The automatic unit 5, shown in FIG. 1, for unstacking the individual layers 3, comprises a basic frame 72 and three side posts 73 which are displaceable thereon. Each post 73 supports a transfer arm 6. Basic frame 72 further supports a switch box 74 accommodating a control system for the different operations described hereinafter. FIGS. 20 and 21 show the upper part of a side post 73. Side post 73 is equipped with a transfer mechanism 74 in which the respective arms 6 are guided on rollers (not shown) to be extended or retracted by means of a transmission and a flange-type motor 75. Transfer arms 6 are designed with a pointed free end closely followed by a slot 76 in which a pawl 77 is mounted for pivoting about a pin 78. Pawl 77 is formed on its forward end with a hook 79 and on its rear end with a bevel 80 engageable by a mating beveled end 81 of an actuating lance 82. Lance 82 in turn is actuated by the vertical arm of a crank lever (not shown) whose horizontal arm carries a roller. The roller engages a lifting rail 83 which can be elevated and lowered by means of two power cylinders 84. In the lifted position of rail 83, lance 82 and thus beveled end 81 is continually urged into contact with bevel 80 of pawl 77, so that hook 79 remains in lifted position during the entire period of retraction of transfer arm 6 and a stack layer 3 placed on arms 6 can be displaced to receiving surfaces 85 provided on the top of side posts 73.

Upon being shifted to receiving surfaces 85 of side posts 73, stack layer 3 is engaged by an endless conveyor chain 86 passes around sprocket wheels 87 and 88. Sprocket wheel 88 is vertically movable by a power cylinder 89 so that the chain 86 can be brought from a position below receiving surface 85 into a position above this surface to engage stack layer 3. With the layer thus engaged, transfer arm 6 can again be extended, and, by lowering rail 83, hook 79 of pawl 77 is retracted.

At their rear sides, each side post 73 is equipped with an endless conveying chain 91 carrying engaging members 92 which are designed with projecting stops 93 and slightly inclined receiving surfaces 94 for the individual pieces 7 of stack layer 3. As shown in FIG. 20, conveyor chain 86 moves the stack layer placed thereon stepwise to conveying chain 91 (space 95) so that engaging elements 92, which arrive from below in the direction of arrow 96, apply by their surfaces 94, against individual pieces 7 of the stack layer and transfer them to the right and downwardly in the direction of arrow 97, to deliver them to a roller bed 8 wherefrom the individual pieces 7 are directed by a feeder 9 (see FIG. 1) to a working machine (not shown).

Figure 22:
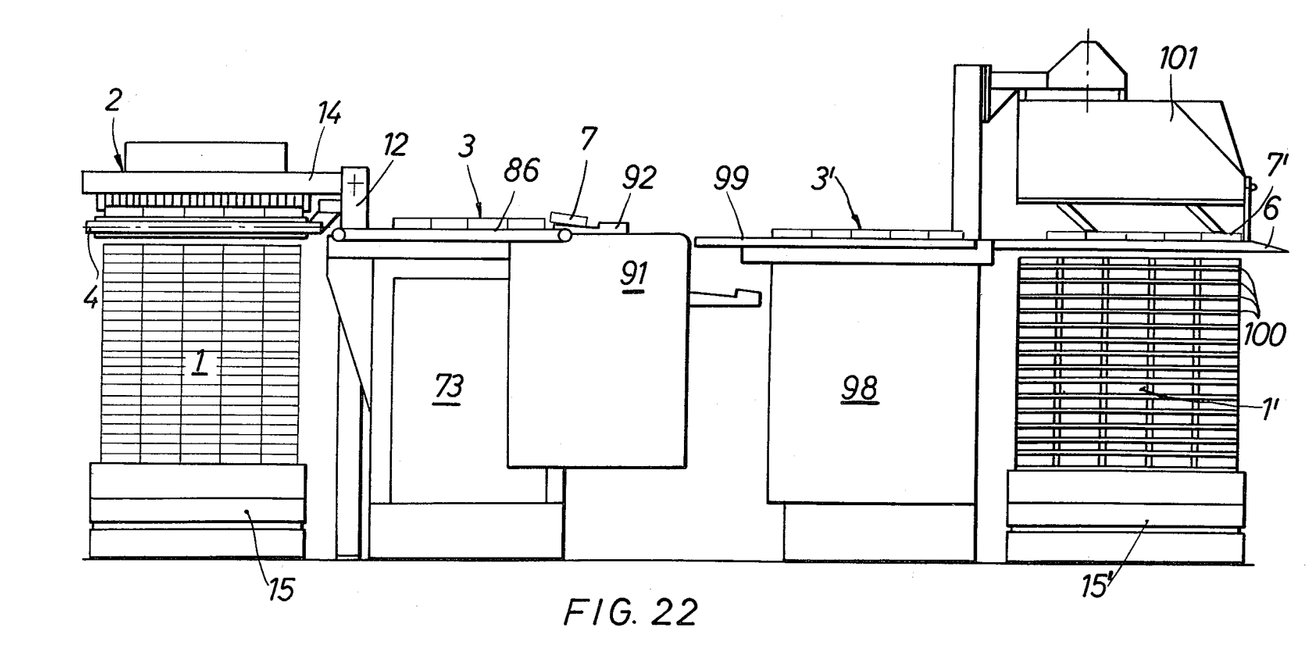
FIG. 22 is a side elevational view of the device with an automatic unpiling unit, and with an automatic stacking unit provided in addition.

In a modified embodiment according to FIG. 22, an automatic stacking unit 98 may be installed at the rear of automatic unit 5, having a receiving upper surface 99 where a new stack layer 3' is formed which may be shifted by extending transfer arms 6' and deposited in a new stack 1' placed on another lifting table 15'. The individual pieces 7' of the newly formed stack may be deposited with an air gap therebetween. Between every two new stack layers 3', stickers 100 may be interposed which are supplied from a magazine 101. In this way, a compact stack 1 may be taken apart and rearranged into a well aerated stickered pile with vertical and horizontal air gaps.

While specific embodiments of the invention have beens shown and described in detail to illustrate the application of the principles of the invention, it will be understood that the invention may be embodied otherwise without departing from such principles.

What is claimed is:

1. A device for separating at least one elongated member at a time from a stack of such members comprising:

shifting means positionable at one end of the stack for shifting at least one member of the stack so as to move a part of the member out over an opposite end of the stack;

a propping element initially positionable at the opposite end of the stack, movable up under the part of the member over the opposite end of the stack to lift the at least one member, and across a top of the remainder of the stack to separate the shifted member from the remainder of the stack;

drive means connected to said propping element for moving the propping element up under the member and across the top of the stack; and a plurality of transfer arms sequentially movable into a space between the lifted and separated at least one member and the remainder of the stack, as the propping element moves across the top of the remainder of the stack, for receiving the at least one member and moving it away from the remainder of the stack, and means connected to said transfer arms, positionable at a side of the stack for sequentially moving the transfer arms.

2. A device according to claim 1, including a sweeping brush connected beneath each of said transfer arms for sweeping the top of the remaining stack.

3. A device according to claim 1, wherein said means for sequentially moving said transfer arms comprises, a side post for each transfer arm, each transfer arm slidably mounted to move substantially horizontally on each respective side post, each side post having a top receiving surface for receiving at least one member of the pile thereon, and transfer arm drive means connected to said side posts and said transfer arms for moving said transfer arms on said side posts.

4. A device according to claim 3, wherein each transfer arm includes a pointed end and a recess adjacent said pointed end, a pivotally mounted pawl in said recess having a hook end adjacent said pointed end and a beveled end, and a lance movably mounted on said transfer arm having a beveled end engeable with said beveled end of said pawl for raising and lowering said hook for engaging and disengaging a member received on each transfer arm.

5. A device according to claim 4, including a lifting rail movably mounted to each of said side posts, said lance of each transfer arm connected to each respective lifting rail, said transfer arm drive means operable to retract each transfer arm away from the stack to position each member received on said transfer arms on the receiving surfaces of said side posts, said side rail including means for moving said lance to disengage said beveled end of said lance from said beveled end of said pawl to drop said hooked end of said pawl.

6. A device according to claim 3, including an endless chain mounted to each of said side posts and means for raising said endless chain above said receiving surface of said side posts to engage a member on said receiving surface and convey it away from said receiving surface.

7. A device according to claim 6, adapted to separate and transfer a plurality of members of the stack positioned in a common layer, the device comprising a transfer mechanism connected to said side posts for separating each member received on said receiving surface of said side posts from an adjacent member in the layer of members, said transfer mechanism comprising an engaging member having an inclined surface and a stop movable into engagement with one member at a time to separate the one member from the remaining members in its layer, and conveyor means connected to said engaging member for moving said engaging member away from said receiving surface of said side posts.

8. A device according to claim 7, wherein each lifting rail comprises a two-armed crank lever.

9. A device according to claim 7, including a roller conveyor positioned adjacent said transfer mechanism for receiving members transferred to said roller conveyor by said engaging member.

10. A device according to claim 6, including an additional automatic stacking mechanism adjacent said transfer mechanism for receiving members from the first mentioned stack and supplying them, in a spaced condition to a second stack.

11. A device according to claim 10, wherein said additional automatic stacking mechanism includes means for positioning spacing elements between stacked members in the second stack.

12. A device for separating at least one elongated member at a time from a stack of such members comprising:
shifting means positionable at one end of the stack for shifting at least one member of the stack so as to move a part of the member out over an opposite end of the stack;
a propping element initially positionable at the opposite end of the stack, movable up under the part of the member over the opposite end of the stack to lift the at least one member, and across a top of the remainder of the stack to separate the shifted member from the remainder of the stack;
drive means connected to said propping element for moving the propping element up under the member and across the top of the stack;
said shifting means comprising:
a shifting plate;
plate moving means connected to the shifting plate for moving the shifting plate vertically, and for moving the shifting plate horizontally in a shifting direction for shifting the at least one member;
a guide rod connected to said shifting plate extending substantially transversely to the shifting direction; and
a plurality of shifting levers engaged to said guide rod and positioned side by side substantially in the direction transverse to the shifting direction on the guide rod;
each of said plurality of shifting levers being elongated in the shifting direction and adapted to engage at least one elongated member of the stack for shifting a layer of a plurality of the elongated members at a time.

13. A device according to claim 12, wherein each of said plurality of shifting levers comprises a weighted end on a side of the lever facing the shifting direction having a rounded bottom side, and a lighter hooked rear portion on a side opposite said weighted end adapted to engage at least one member, each of said plurality of shifting levers including an extension intermediate its length having a substantially vertically oblong slot therein engaging said guide rod.

14. A device according to claim 12, wherein said plate moving means comprises a shifting plate frame, at least one further guide rod connected to said shifting plate frame and extending substantially in the shifting direction, at least one plate extension connected to said plate and engaged with said further guide rod for sliding motion therealong, and a conveyor drive mounted for conveying motion on said shifting plate and connected to said plate extension, said conveyor drive operable to move said shifting plate substantially in the shifting direction.

15. A device according to claim 14, wherein said shifting means further includes a support frame, said shifting plate frame pivotally mounted at one end thereof to said support frame, and a driving element connected to an opposite end of said shifting plate and to said support frame for shifting said opposite end of said shifting plate substantially vertically to vertically displace said shifting plate.

16. A device for separating at least one elongated member at a time from a stack of such members comprising:
shifting means positionable at one end of the stack for shifting at least one member of the stack so as to move a part of the member out over an opposite end of the stack;
a propping element initially positionable at the opposite end of the stack, movable up under the part of the member over the opposite end of the stack to lift the at least one member, and across a top of the remainder of the stack to separate the shifted member from the remainder of the stack;
drive means connected to said propping element for moving the propping element up under the member and across the top of the stack; and
hold-down means positionable adjacent said opposite end of the stack for holding down an end of said at least one shifted and lifted member of the stack in the vicinity of the opposite end of the stack.

17. A device according to claim 16, wherein said hold-down means comprises a plate adapted to extend substantially across the stack in the vicinity of the opposite end of the stack and above the propping element in its initial position, and at least two vertically movable thrust members connected to said hold-down plate, said device including a column positionable in the vicinity of the opposite end of the stack and a cantilever support adapted to extend over the opposite end of the stack to which said thrust members are connected.

18. A device for separating at least one elongated member at a time from a stack of such members comprising:
shifting means positionable at one end of the stack for shifting at least one member of the stack so as to move a part of the member out over an opposite end of the stack;
a propping element initially positionable at the opposite end of the stack, movable up under the part of the member over the opposite end of the stack to lift the at least one member, and across a top of the remainder of the stack to separate the shifted member from the remainder of the stack;
drive means connected to said propping element for moving the propping element up under the member and across the top of the stack;
said propping element comprising a propping frame connected to said propping element driving means and at least one roller rotatably mounted to said propping frame on an axis extending substantially transversely to a shifting direction of the at least one member which is shifted by said shifting means, said propping element drive means comprising at least two columns positionable at the first mentioned and opposite ends of the stack, and a guide track member connected between said two columns, said propping frame mounted for movement along said guide track.

19. A device according to claim 18, including roller guide means connected to said propping frame and a plurality of roller trackways defined on said guide track member on which said roller guide means are engaged for movement of said propping frame on said guide track member.

20. A device according to claim 19, wherein said propping element driving means further comprises a conveyor drive mounted in one of said columns which is adapted to be positioned adjacent the opposite end of the stack, said conveyor drive connected to one end of said guide track member for moving said one end of said guide track member vertically to move said propping frame and at least one roller vertically.

21. A device according to claim 20, wherein said guide track member is pivotally connected to the other of said columns adapted to be positioned adjacent the one end of the stack.

22. A device according to claim 20, wherein said conveyor drive for vertically moving one end of said guide track member is actuated by a hydraulic cylinder piston combination, said conveyor drive comprising a chain engaged around a pair of sprockets rotatably mounted to said one column.

23. A device according to claim 18, including a conveyor drive mounted between said guide track member and said propping frame for moving said propping element longitudinally along the length of the stack, and on the guide track member.

24. A device according to claim 18, wherein said guide track member comprises a box girder.

25. A device according to claim 18, wherein said shifting means is connected to one of said columns adapted to be positioned against the first mentioned end of the stack, said shifting means comprising a support frame connected to said one column, a shifting frame pivotally mounted at one end thereof to said support frame, piston and cylinder means connecting an opposite end of said shifting frame to said support column for vertical movement of said opposite end of said shifting frame, a shifting plate slidably mounted on said shifting frame for movement in a shifting direction of the at least one member of the stack, and a plurality of shifting levers rotatably mounted with vertical play to said shifting plate for engaging at least one member of the stack.

26. A device for separating the at least one elongated member at a time from a stack of such members comprising:

shifting means positionable at one end of the stack for shifting the at least one member of the stack so as to move a part of the member out over an opposite end of the stack;

a propping element initially positionable at the opposite end of the stack, movable up under the part of the member over the opposite end of the stack to lift the at least one member, and across a top of the remainder of the stack to separate the shifted member from the remainder of the stack;

drive means connected to said propping element for moving the propping element up under the member and across the top of the stack; and a sweeping brush connected to the bottom of said propping element for sweeping the top of the remaining stack as said propping element is moved across the top of the remaining stack.

* * * * *